United States Patent [19]

Barr et al.

[11] Patent Number: 4,491,434
[45] Date of Patent: Jan. 1, 1985

[54] HANDHELD VIEWER FOR TRANSPARENCY FILM

[75] Inventors: Charles A. Barr, Waltham; David E. Van Allen, Malden; John K. Zanardelli, Quincy, all of Mass.

[73] Assignee: Polaroid Corporation, Cambridge, Mass.

[21] Appl. No.: 544,547

[22] Filed: Oct. 24, 1983

[51] Int. Cl.$^3$ .............................................. G02B 27/02
[52] U.S. Cl. ...................................... 40/362; 40/364; 40/366; 350/241
[58] Field of Search ................ 40/361, 362, 363, 364, 40/365, 366, 367; 350/241, 78

[56] References Cited

U.S. PATENT DOCUMENTS

| | | | |
|---|---|---|---|
| 2,520,432 | 8/1950 | Robertson | 40/367 |
| 2,550,799 | 5/1951 | Fuller | 40/364 |
| 3,104,483 | 9/1963 | Thompson | 40/364 |
| 3,218,745 | 11/1965 | Golden | 40/354 X |
| 3,672,756 | 6/1972 | Kinsinger | 353/68 |
| 4,081,920 | 4/1978 | Magee | 40/362 |
| 4,234,244 | 11/1980 | Klein | 40/367 |
| 4,371,249 | 2/1983 | Czumak et al. | 354/304 |
| 4,372,068 | 2/1983 | Knapp et al. | 40/367 |
| 4,375,324 | 3/1983 | Holmes | 354/303 |
| 4,390,257 | 6/1983 | Fernekes | 40/367 |

Primary Examiner—Gene Mancene
Assistant Examiner—Wenceslao J. Contreras
Attorney, Agent, or Firm—Alfred E. Corrigan

[57] ABSTRACT

A compact, handheld viewer adapted for use with photographic transparencies which are located within a film cassette in roll form, in a strip containing a plurality of individual scenes, or individually mounted transparencies. The viewer includes a manually operable drive system for selectively driving either a film take-up reel, for withdrawing film from a film cassette and advancing it through a projection station, or a film spool for rewinding the film into the film cassette.

3 Claims, 7 Drawing Figures

HANDHELD VIEWER FOR TRANSPARENCY FILM

BACKGROUND OF THE INVENTION

1. Field of the Invention

This invention relates to a handheld transparency film viewer.

2. Description of the Prior Art

The present invention relates to a compact, handheld transparency film viewer and, more particularly, to a viewer which is adapted for use with transparency film which may be located (1) within a film cassette in roll form, (2) strip form wherein the strip contains a plurality of individual scenes, and (3) individual mounts each of which contains a single transparency frame.

The prior art is replete with viewers, handheld or otherwise, which are adapted for use with transparency film. Some of these viewers are adapted for use with transparency film only when it, the film, is in a particular format. For example, the viewer shown and described in U.S. Pat. No. 4,081,920 appears to be restricted to use with transparency film located within a film cassette similar to the 126 mm format. Other viewers, for example, see the microfilm viewers described in U.S. Pat. Nos. 3,672,756 and 4,234,244, are more versatile in that they are adapted for use with film in roll or microfiche form while others such as the viewer described in U.S. Pat. No. 2,550,799 are adapted for use with transparency film in strip form or in individual mounts. However, there does not appear to be a viewer which has the versatility to be used with film in roll form located within a film cassette, such as shown in U.S. Pat. Nos. 4,375,324 and 4,371,249, as well as with film in strip form or individually mounted transparencies.

SUMMARY OF THE INVENTION

The instant invention relates to a compact, handheld viewer for use with photographic transparency film located within a film cassette in roll form, in individual film mounts or in a strip containing a plurality of frames each of which contains a visible image of a photographed scene. The viewer includes a housing having a first chamber which is configured to receive a film cassette, preferably of the conventional 35 mm cylindrical configuration. The cassette contains a length of processed photographic film wound about a film spool rotatably supported therein such that a leading end of the length of film, i.e., a leader, extends to the exterior of the cassette via a film exit opening in the cassette. The housing also includes a second chamber having a take-up spool therein to which the leader of the film is adapted to be releasably attached, and a passageway interconnecting the first and second chambers. The passageway includes a projection station having a source of illumination and a diffuser plate on one side thereof and a viewing lens mounted on the other side thereof. The projection station has a width, as measured along the optical axis of the lens, slightly greater than that of (1) the remainder of the passageway on each side thereof and (2) the thickness of a mount for supporting an individual transparency frame. Conversely, the passageway sections of the smaller width have a dimension less than the corresponding dimension of the mount and greater than that of the film itself. Accordingly, unmounted film is adapted to be advanced in a lateral direction, i.e., side-to-side, through the projection station whereas the mounts are to be moved in a direction at right angles to said transverse direction directly into and out of the projection station.

Mounted within the housing is a drive system including a thumb wheel or drive gear having a portion which extends to the exterior of the housing. The drive system is adapted to rotate the film take-up spool so as to withdraw the film from the film cassette while simultaneously advancing it through the projection station or conversely drive the film spool so as to rewind the film into the film cassette. The drive system is constructed such that actuation of the drive gear, by the thumb of the user, in the direction of the take-up reel automatically insures that it will be driven in the correct direction thus withdrawing the film from the cassette. Actuation of the drive gear in a direction toward the film cassette results in its film spool being driven in a direction which rewinds the film into the cassette.

The aforementioned source of illumination includes a battery powered bulb and a reflector which also functions as part of a switch for connecting the bulb to the battery. Specifically, the reflector is mounted for limited movement in a vertical plane, and it carries one of the contacts of the switch. The reflector is mounted directly under a button mounted in a top wall of the housing. The bulb, and thus the projection station, is illuminated by depressing the button which in turn results in a slight downward movement of the reflector and its attached contact until the switch is closed. A pair of resilient, cantilever fingers provide a force for returning the reflector and button to their original positions.

An object of the invention is to provide a compact viewer for use with film which may be located within a film cassette in roll form, for film in strip form, and for individual film frames supported within their own mounts.

Another object of the invention is to provide a viewer of the type described with a drive system which insures that a length of film will be moved in the same direction that the operator moves a manually actuatable thumb wheel.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

For a fuller description of the invention, reference should be had to the following detailed description taken in connection with the accompanying drawings wherein.

DETAILED DESCRIPTION OF THE INVENTION

Figure 1:
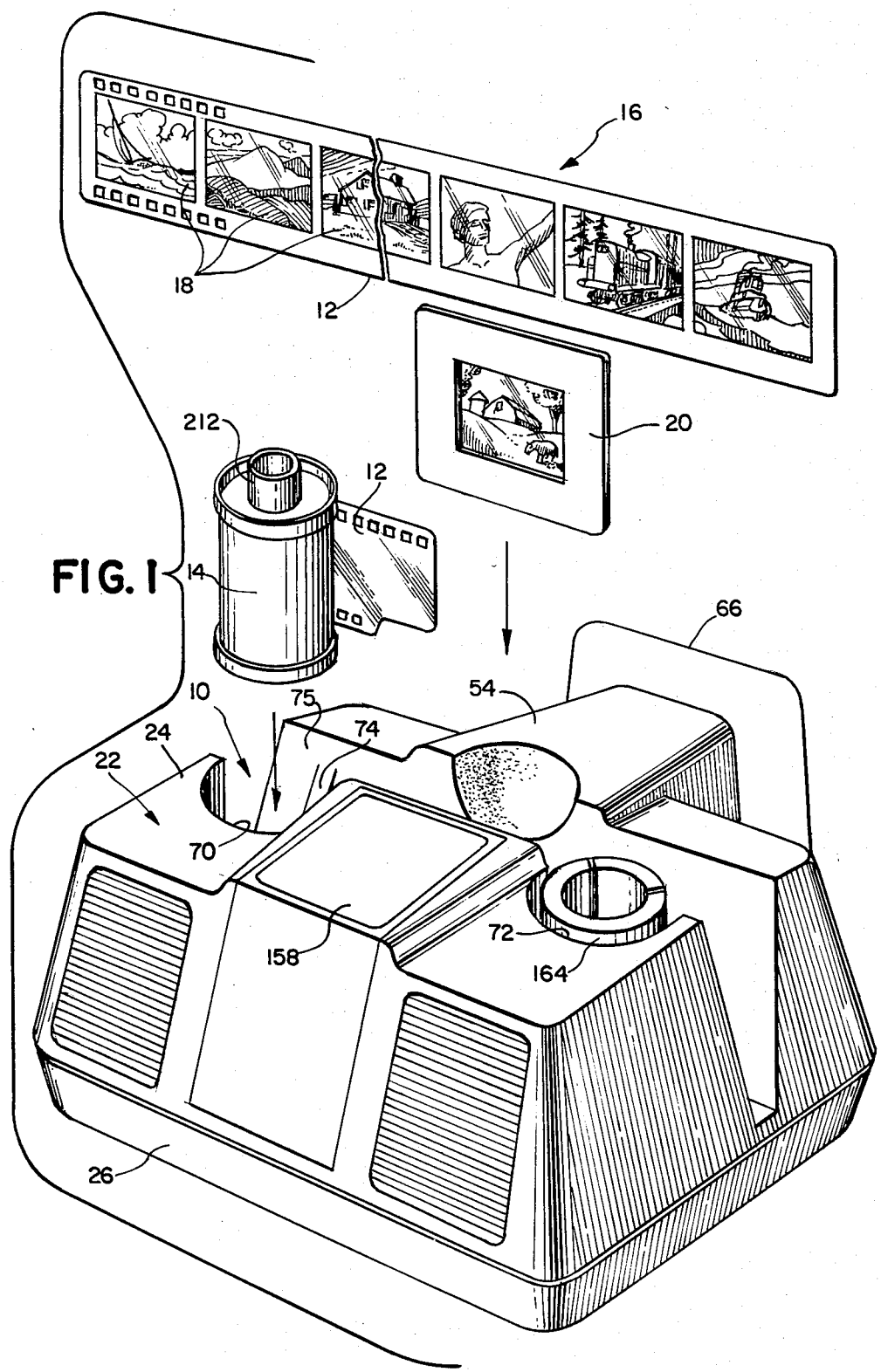
FIG. 1 is a perspective view of a preferred form of viewer and the various forms of film usable therewith.

Reference is now made to the drawings wherein is shown a compact, handheld viewer 10 which is adapted for use with photographic transparency film 12, preferably of the instant type, which may be located within a film cassette 14 in roll form, in strip form 16 containing a plurality of frames 18, and in individual film mounts 20.

The viewer 10 includes a housing 22 which is preferably formed from an ABS polymer. The housing 22 includes a top section 24 and a bottom section 26, which sections enclose an inner frame 28. The inner frame 28 includes a generally rectangularly shaped support surface 30 from which depend a pair of parallel side walls 32 and 34. The side wall 32 includes a pair of apertures (not shown), each of which is adapted to receive a lug 36 which extends inwardly from an interior surface of a side wall 38 of the bottom section 26. An opposite wall 40 includes suitable means (not shown) for securing the opposite side of the inner frame 28 to the bottom section 26. E.g., the interior surface of the wall 40 may be formed with an inwardly extending lip under which the side wall 34 would first be located during assembly prior to rotating the inner frame 28 into a horizontal position wherein the lugs 36 would snap into the aforementioned apertures, thus securing the inner frame 28 to the bottom section 26. Thus secured, the support surface 30 is spaced from a wall 42 of the bottom section 26 by the side walls 32 and 34 so as to define a compartment for slidably receiving a generally planar battery 44 via a slot 46 located in an end wall 48 of the bottom section 26. Additional resilient latching members, such as shown at 50 and 52, are formed in the inner frame 28 and are adapted to engage surfaces of the top section 24 for securing the latter to the inner frame 28 and thus to the lower section 26.

The top section 24 of the viewer 10 includes an extension defined by walls 54, 56 and 58 which, together with a wall 60 of the lower section 26, define a tapered light-tight tunnel 60 through which a transparency may be viewed. The tunnel 60 has a projection station at one end thereof and an eye lens 64 and eyecup 66 suitably mounted on the opposite end thereof. A semi-circular recess 68 is formed in the wall 54 for facilitating insertion and removal of an individually mounted transparency into and out of the projection station.

The top section 24 further includes first and second chambers 70 and 72. The first chamber 70 is configured to receive the film cassette 14 and has a resilient finger 74 formed in cantilever fashion in a wall 75 for frictionally maintaining the film cassette 14 in a vertical orientation within the first chamber 70.

The first and second chambers 70 and 72 are separated by a third chamber 76 which is adapted to be enclosed at one end by a cover 78. The third chamber 76 is defined in part by a bottom wall 80, a pair of side walls 82 and 84, and a wall 86 having an opening 88 therein. The bottom wall 80 is formed with a pair of resilient fingers 90 (only one being shown) which extend in cantilever fashion toward the wall 86. The bottom wall 80 also includes an opening 92 and an aperture 94.

A reflector 96, having a width substantially equal to the spacing between the side walls 82 and 84, is adapted to be supported within the third chamber 76 for vertical movement by the resilient fingers 90, as will be more fully explained later. A bottom wall of the reflector is cut out so as to receive a projection lamp 98. The light from the lamp 98 is adapted to be diffused by a diffuser 100. The diffuser 100 includes a pair of resilient fingers 102 and 104 which are adapted to be received within tapered guideways 106 (only one being shown) formed within the side walls 82 and 84 of the third chamber 76 for supporting the diffuser 100 in a vertical orientation between the reflector 96 and the projection station 62. The diffuser 100 also includes an inwardly extending (towards the eye lens 64) projection 108 which is adapted to snap into a recess 110 in the wall 86 to maintain it in place.

The lamp 98 is adapted to be received within a metal socket 112 having a pair of spaced flanges 114 and 116. The flanges 114 and 116 are adapted to frictionally engage opposite sides of a support 118 which extends upwardly from the surface 30 of the inner frame 28 so as to position the lamp 98 within the reflector 96.

The lamp 98 is adapted to be electrically connected to the poles of the battery 44 by a series of electrical contacts. Specifically, a first metal contact 120 is secured to a post 122 via an aperture 124 such that its pad 126 extends under the socket 112 and is in engagement with a contact 128 on the bottom of the lamp 98. The first contact 120 is electrically connected to one end of a second metal contact 130 via a wire 132. The other end of the contact 130 is threaded through an aperture 134 in the inner frame 28 and resurfaces via another aperture 136, thus locating the intermediate portion of the switch 130 in position to be engaged by one of the terminals of the battery 44. A V-shaped member 138 having an integral mounting chip 140 includes a fixed electrical contact 142 and a movable electrical contact 144. The member 138 is properly positioned by threading the free end 146 of the contact 142 through an aperture 148 in the inner frame 28 and then running it beneath the latter and up through another aperture 150 in the inner frame 28, thus locating the contact 142 in position to be engaged by the other terminal of the battery 44. Also, the V-shaped member 138 is secured to a flange 152 on the inner frame member 28 by the clamp 140. The free end 154 of the contact 144 is fixedly secured to a tang 156 which extends downwardly from the reflector 96.

The operator of the viewer 10 may illuminate the lamp 98 by pressing downward on a pad 158, which is mounted for vertical movement in the cover 78. As the pad 158 is depressed, it moves the reflector 96 thereby deflecting the fingers 90. Thus, the contact 144 is moved downwardly until it makes electrical contact with a contact 160 on the socket 112 thus completing the circuit to the battery 44. When the pad 158 is released, the resiliency of the fingers 90 returns the reflector 96 and the pad 158 to their original positions.

A film spool drive 162 is rotatively supported within the first chamber 70 and a film take-up reel 164 is rotatively supported within the second chamber 72. More specifically, the film spool drive 162 is rotatively mounted on a post 166 which extends upwardly from the inner frame 28 while the take-up reel 164 is similarly mounted on a post 168. Each of the posts 166 and 168 includes a member 170 and 172, respectively, which is adapted to be resiliently cammed inwardly during assembly so as to conform to the inside diameter of the film spool drive 162 and the take-up reel 164, respectively, to thereby provide a slight drag thereupon of a magnitude to prevent free wheeling. The film spool drive 162 extends upwardly through an aperture 174 in a guide plate 176 while the take-up reel 164 extends in a similar manner through an aperture 178. The guide plate 176 is securely connected to the inner frame 28 by a pair of resilient fasteners 180 and 182 which are adapted to snap over the opposite end of the guide plate 176 during assembly.

The guide plate 176 includes an open ended channel or passageway 184 which interconnects the first and second chambers 70 and 72. The passageway 184 includes an intermediate portion or projection station 186 whose walls are spaced from each other by a distance slightly greater than the thickness of the slide frame 20 whereas the walls of the adjacent portions of the passageway 184 have a spacing slightly larger than the thickness of the film 12.

Figure 2:
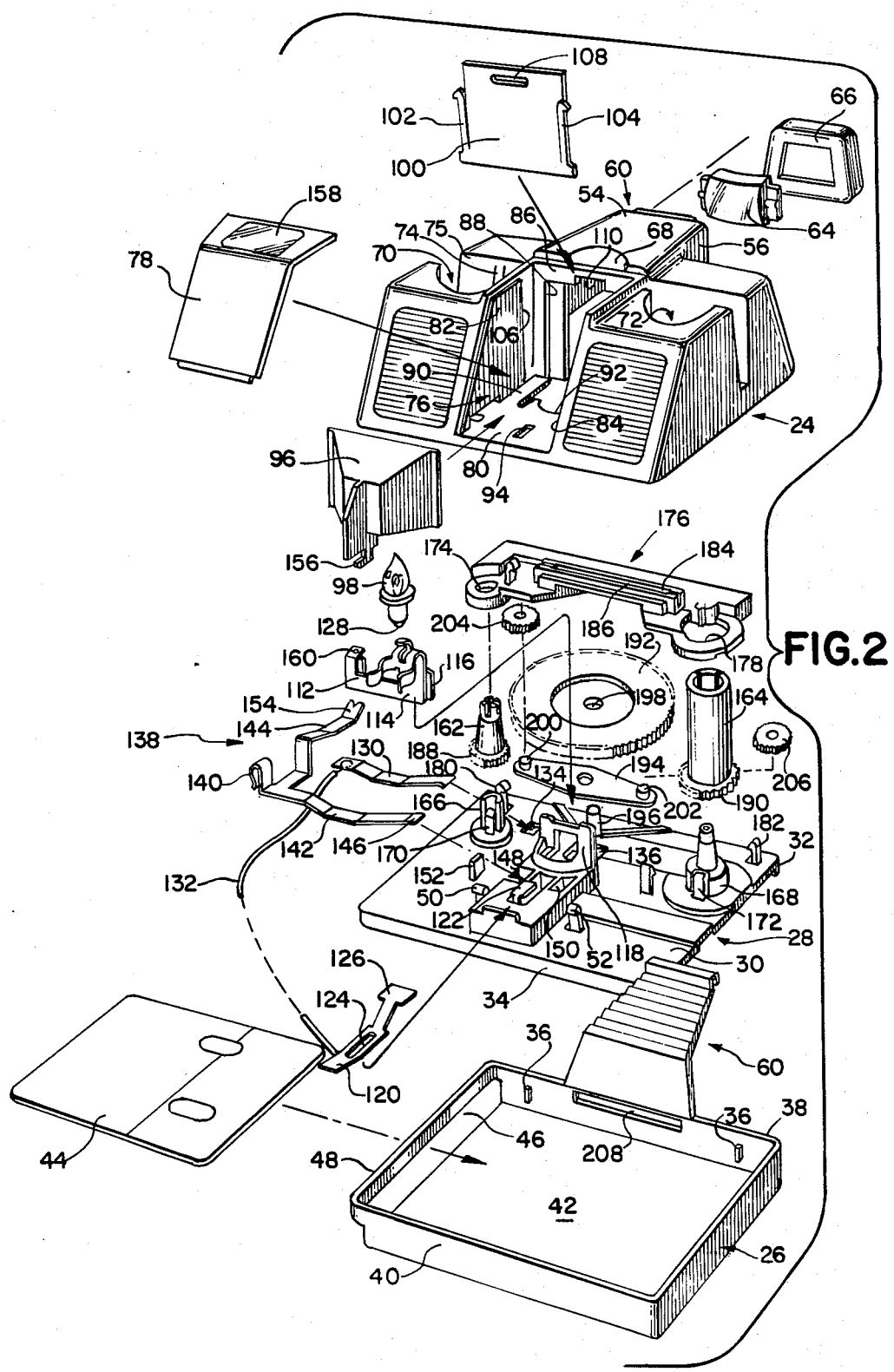
FIG. 2 is an exploded perspective view of the viewer.
Figure 3:
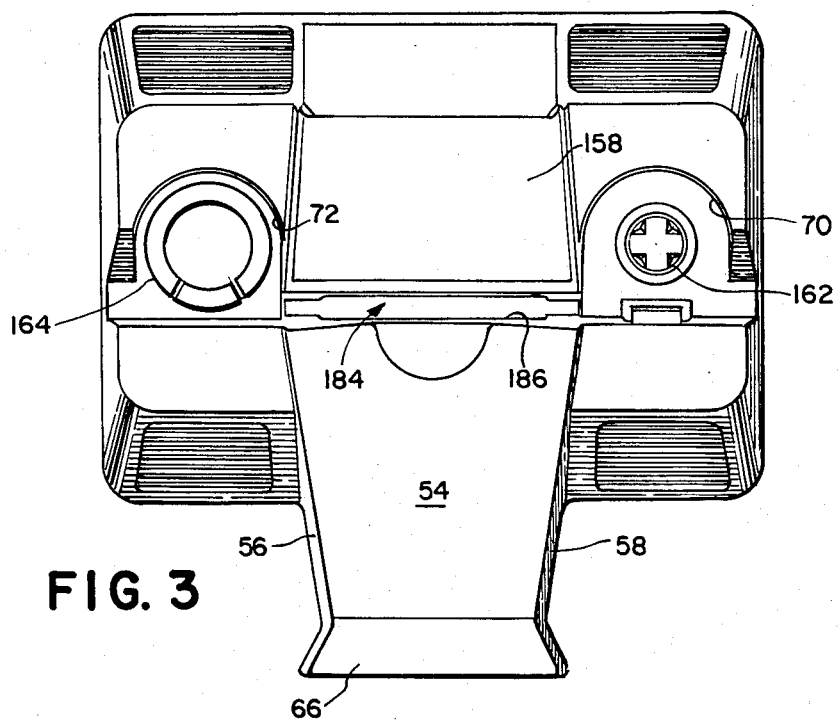
FIG. 3 is a plan view of the viewer.
Figure 4:
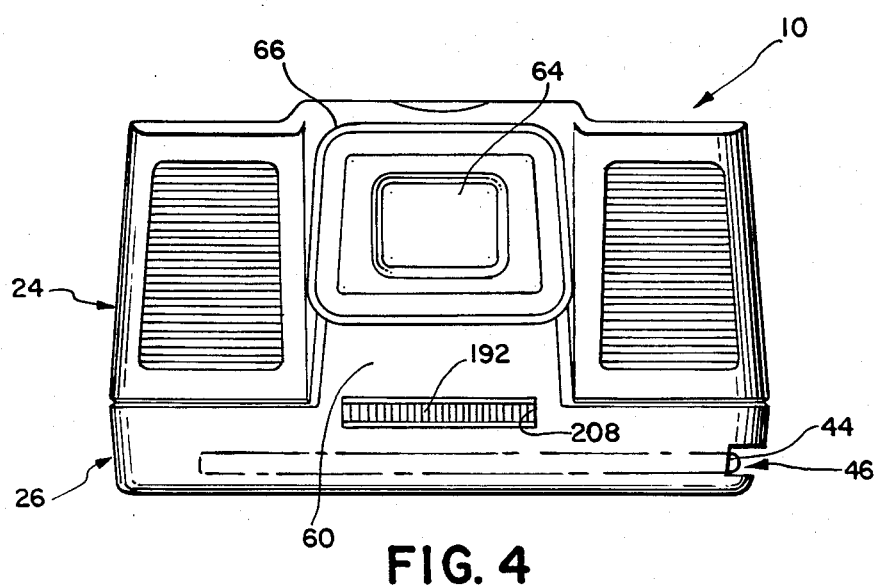
FIG. 4 is a rear elevational view of the viewer.
Figure 5:
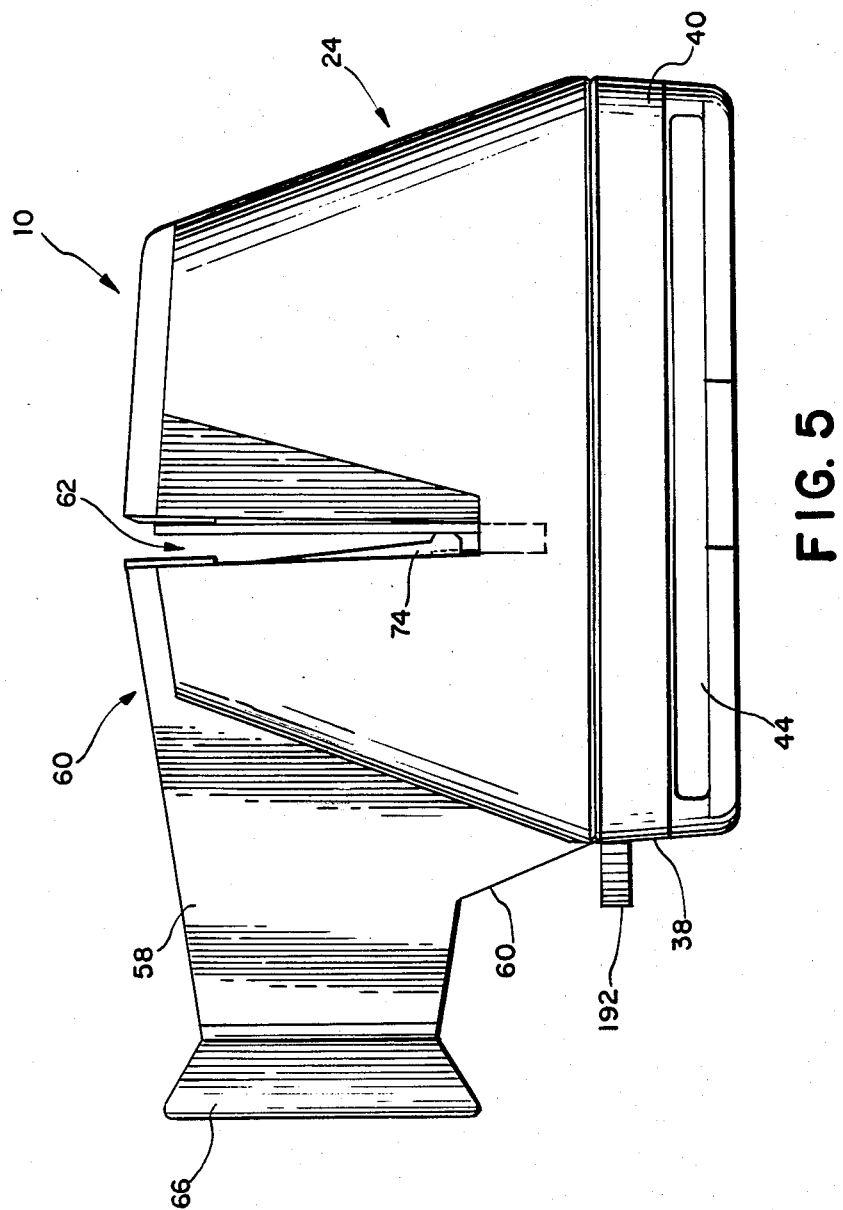
FIG. 5 is a side elevational view of the viewer.

The film spool drive 162 and the film take-up reel 164 are each formed with a gear 188 and 190, respectively, on their lower ends whereby they may be selectively driven in response to the manual actuation of a thumb wheel or drive gear 192. More specifically, the means for driving either the film spool drive 162 or the film take-up reel 164 includes an arm 194 which is rotatably mounted on a shaft 196 which extends upwardly from the inner frame 28. The shaft 196 also extends upwardly through a bearing 198 in the gear 192 so as to rotatably support the latter. Opposite ends of the arm 194 are provided with shafts 220 and 202 for rotatably supporting a pair of gears 204 and 206 in mesh with the drive gear 192. As best seen in FIG. 5, a portion of the drive gear 192 extends to the exterior of the viewer 10, via a slot 208 (see FIG. 2) in the lower section 26, where it may be manually actuated.

Figure 6:
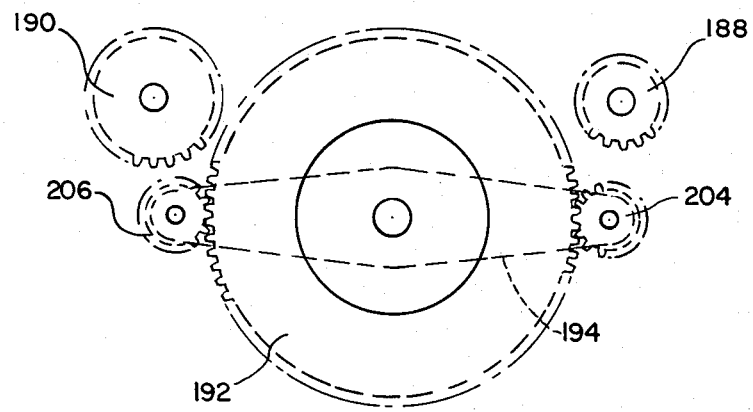
FIG. 6 is a plan view of a drive system employed in the viewer.
Figure 7:
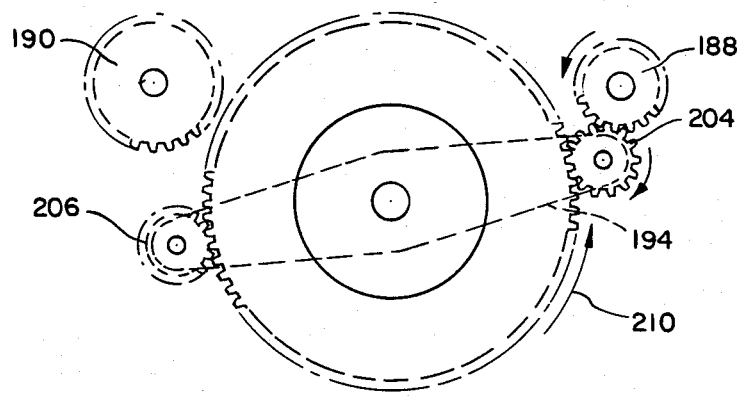
FIG. 7 is a view similar to FIG. 6 showing the relationship between elements when a length of film is being rewound into a film cassette.

The drive system is schematically shown in FIG. 6 where suitable means such as a spring (not shown) maintain the arm 194 in the position shown and in FIG. 7 wherein the drive gear 192 has been rotated in the direction of the arrow 210 (which is also movement of the exteriorly located portion of the drive gear 192 toward the film spool drive gear 188) thus rotating the gear 188 in a counterclockwise direction. Such rotation of gear 188 is effective to rotate a film spool 212 in a direction which rewinds the film 12 into the film cassette 14. Conversely, actuation of the drive gear in a direction opposite to that of arrow 210 results in rotation of the arm 194 in a clockwise direction until the gear 206 meshes with the gear 190. Thereafter, further actuation of the drive gear 192 in the clockwise direction results in clockwise rotation of the gear 190 and the film take-up spool 164 in a direction which withdraws the film 12 from the film cassette 14. Thus, unlike the drive system utilized in U.S. Pat. No. 4,234,244 wherein the operator must move a lever in order to select the component which is to be subsequently driven, the instant drive system automatically provides for movement of the film in the direction that the exposed portion of the drive gear is actuated.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A compact, handheld viewer for use with photographic transparency film located within a film cassette in roll form, in individual film mounts, or in strip form, said viewer comprising:

a housing having means for defining first and second chambers, said first chamber being configured to receive a film cassette of the type having a spool therein about which a length of film containing a plurality of frames each of which contains a visible image is wound and an exit slot through which a leader or leading end of the film is adapted to extend to the exterior of the cassette for attachment to a take-up reel;

means defining a passageway interconnecting said first and second chambers, said passageway including a projection station through which the film in the film cassette or a film strip containing a plurality of individual scenes are adapted to be advanced and into which individually mounted film transparencies are adapted to be inserted;

a film spool drive rotatively mounted within said first chamber;

a film take-up reel rotatively mounted within said second chamber, said take-up reel including means for releasably securing the leader to said take-up reel;

means for illuminating said projection station; and manually actuatable means for selectively driving said film take-up reel in a direction so as to withdraw the film from the film cassette and advance it through said projection station or for driving said film spool drive in a direction which will rewind the film into the film cassette while simultaneously unwinding the film from said film take-up reel.

2. A compact, handheld viewer as defined in claim 1 wherein said manually actuatable means includes a rotatively supported arm, a gear rotatively supported on opposite ends of said arm and a drive gear coaxially mounted with said arm and in constant enmeshment with said gears, said drive gear including a portion which extends to the exterior of said housing where it is adapted to be manually actuated.

3. A compact, handheld viewer as defined in claim 2 wherein rotation of said portion of said gear in a direction toward said film take-up reel is effective to rotate said arm in a direction so as to move one of said gears into driving enmeshment with a gear attached to said film take-up reel.

* * * * *